US008110320B2

(12) United States Patent
Hamrock

(10) Patent No.: US 8,110,320 B2
(45) Date of Patent: Feb. 7, 2012

(54) METHOD OF MAKING DURABLE POLYMER ELECTROLYTE MEMBRANES

(75) Inventor: Steven J. Hamrock, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 11/962,971

(22) Filed: Dec. 21, 2007

(65) Prior Publication Data

US 2008/0160380 A1 Jul. 3, 2008

Related U.S. Application Data

(60) Provisional application No. 60/882,754, filed on Dec. 29, 2006.

(51) Int. Cl.
*H01M 8/10* (2006.01)
*B05D 1/02* (2006.01)
*B05D 1/16* (2006.01)

(52) U.S. Cl. ............. 429/535; 429/492; 521/25; 521/27

(58) Field of Classification Search .................... 429/33, 429/435, 492; 521/25, 27
See application file for complete search history.

(56) References Cited

U.S. PATENT DOCUMENTS 6,624,328 B1 9/2003 Guerra
7,879,475 B2 * 2/2011 Toyoda et al. ................ 429/474
7,989,115 B2 * 8/2011 Durante et al. ............... 429/479
2004/0043283 A1 * 3/2004 Cipollini et al. ................ 429/40
2004/0116742 A1 6/2004 Guerra
2004/0121210 A1 6/2004 Hamrock et al.
2005/0095355 A1 * 5/2005 Leistra et al. ................... 427/58
2005/0098101 A1 * 5/2005 Shen et al. .................... 118/696
2005/0136308 A1 * 6/2005 Andrews et al. ................ 429/30
2006/0019140 A1 * 1/2006 Kawazoe et al. ............... 429/33
2006/0063054 A1 3/2006 Frey et al.
2006/0063055 A1 3/2006 Frey et al.
2006/0099475 A1 * 5/2006 Watanabe et al. ............... 429/33
2006/0166069 A1 * 7/2006 Min et al. ........................ 429/33
2007/0099052 A1 5/2007 Frey et al.
2007/0099053 A1 5/2007 Frey et al.
2007/0104994 A1 * 5/2007 Endoh et al. .................... 429/33

FOREIGN PATENT DOCUMENTS

EP 1 657 772 A2 5/2006
EP 1657772 * 5/2006
WO WO 2005/124911 A1 12/2005

OTHER PUBLICATIONS

Mikael Ludvigsson, Jan Lindgren and Jorgen Tegenfeldt. "Incorporation and characterisation of oxides of manganese, cobalt and lithium into Nafion 17 membranes." Feb. 15, 2001. Journal of Materials Chemistry, 11, 1269-1276.*

Ludvigsson, M., Lindgren, J., and Tegenfeldt, J.: "Incorporation and Characterisation of Oxides of Manganese, Cobalt, and Lithium Into Nafion 117 Membranes", J. Mater. Chem., 2001, vol. 11, pp. 1269-1276.

* cited by examiner

*Primary Examiner* — Ula C Ruddock
*Assistant Examiner* — Amanda Barrow
(74) *Attorney, Agent, or Firm* — Philip Y. Dahl; Stephen L. Crooks

(57) ABSTRACT

A method of making a durable fuel cell polymer electrolyte membrane is provided comprising the steps of: a) providing a polymer electrolyte membrane; b) providing a solution of a salt selected from the group consisting of manganese salts and cerium salts or a suspension of particles of a compound selected from the group consisting of manganese oxides and cerium oxides; and c) applying the solution or suspension to the polymer electrolyte membrane by a method selected from the group consisting of brushing, spraying and use of a slot die. Some embodiments comprise metered application of the solution to the polymer electrolyte membrane.

5 Claims, No Drawings

METHOD OF MAKING DURABLE POLYMER ELECTROLYTE MEMBRANES

CROSS REFERENCE TO RELATED APPLICATION

This application claims the benefit of U.S. Provisional Patent Application No. 60/882,754, filed Dec. 29, 2006, the disclosure of which is incorporated by reference herein in its entirety.

FIELD OF THE DISCLOSURE

This invention relates to methods of making fuel cell polymer electrolyte membranes (PEM's) with improved durability by addition of cerium or manganese additives after formation.

SUMMARY OF THE INVENTION

Briefly, the present disclosure provides a method of making a durable fuel cell polymer electrolyte membrane comprising the steps of: a) providing a polymer electrolyte membrane; b) providing a solution of a salt selected from the group consisting of manganese salts and cerium salts; and c) applying the solution to the polymer electrolyte membrane by a method selected from the group consisting of brushing, spraying and use of a slot die. In some embodiments, step c) may consist essentially of metered application of the solution to the polymer electrolyte membrane.

In another aspect, the present disclosure provides a method of making a durable fuel cell polymer electrolyte membrane comprising the steps of: a) providing a polymer electrolyte membrane; b) providing a suspension of particles of a compound selected from the group consisting of manganese oxides and cerium oxides; and c) applying the suspension to the polymer electrolyte membrane by a method selected from the group consisting of brushing, spraying and use of a slot die. In some embodiments, step c) may consist essentially of metered application of the suspension to the polymer electrolyte membrane.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base;

"polyvalent cation" means a cation having a charge of 2+ or greater;

"highly fluorinated" means containing fluorine in an amount of 40 wt % or more, typically 50 wt % or more and more typically 60 wt % or more; and "acid form" means, with regard to an anionic functional group, that it is neutralized by a proton.

It is an advantage of the present invention to provide methods of making polymer electrolyte membranes and fuel cell membrane electrode assemblies with increased durability.

DETAILED DESCRIPTION

U.S. Pat. App. Pub. Nos. 2006/0063054 A1 and 2006/0063055 A1 and U.S. patent application Ser. Nos. 11/261,053 and 11/262,268, incorporated herein by reference, address the use of cerium or manganese additives to improve durability of polymer electrolyte membranes (PEM's). The present invention provides methods of making PEM's with improved durability by addition of cerium or manganese additives to PEM's after membrane formation.

A membrane electrode assembly (MEA) or polymer electrolyte membrane (PEM) according to the present invention may be useful in electrochemical cell such as a fuel cell. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are highly fluorinated and most typically perfluorinated. The polymer electrolytes useful in the present invention are typically copolymers of tetrafluoroethylene and one or more fluorinated, acid-functional comonomers. Typical polymer electrolytes include Nafion™ (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2—CF_2CF_2CF_2CF_2—O—CF{=}CF_2$, described in U.S. patent application Ser. Nos. 10/322,254, 10/322,226 and 10/325,278, which are incorporated herein by reference. The polymer typically has an equivalent weight (EW) of 1200 or less and more typically 1100 or less. In some embodiments, polymers of unusually low EW can be used, typically 1000 or less, more typically 900 or less, and more typically 800 or less, often with improved performance in comparison to the use of higher EW polymer.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. In some embodiments of the method according to the present disclosure, additives are added to the membrane only after annealing and not before, and therefore annealing conditions are not impacted by their presence, which may, e.g., raise membrane Tg, thus necessitating higher annealing temperatures. The PEM typically has a thickness of less than 50 microns, more typically less than 40 microns, more typically less than 30 microns, and most typically about 25 microns.

In one embodiment of the present invention, one or more cerium or manganese compounds in solution or suspension is applied to the polymer electrolyte membrane after membrane formation. The cerium or manganese is more typically in solution. Any suitable solvent or combination of solvents may be used, which may include water, alcohols, ethers, ketones, and combinations thereof. In some embodiments, a propanol/water mixture in a ratio of 70/30 to 60/40 may be used. The solution or suspension may be applied by any suitable method, which may include brushing, spraying or use of a slot die. Typically, a method is used which allows metered application, such as the use of a slot die. Spraying may also allow metered application. Typically the amount of solution or dispersion added is not so much as would saturate the membrane. Thus swelling of the membrane may be avoided. Typically the solution or suspension is applied to only one side of the polymer electrolyte membrane, but the other side may also be treated in a separate step. Where a suspension of particles of an oxide is applied to one side of a polymer electrolyte membrane, the resulting polymer electrolyte membrane bears a single-side coating of the oxide particles.

In some embodiments, the additive compounds include cerium. The cerium may be in any suitable oxidation state. In some embodiments, the additive solution/suspension includes ionic cerium in solution, i.e., a cerium salt. In some embodiments, the additive solution/suspension includes cerium oxides in suspension.

As used herein, cerium salt means a compound including cerium cations wherein the positive charge of ionized cerium is balanced by an equal negative charge of an anion, excluding compounds comprising $O^{2-}$ oxygen anions as the primary counterions to the cerium cations; i.e., excluding cerium oxides. The salt may comprise any suitable anion, including chloride, bromide, hydroxide, nitrate, carbonate, sulfonate, phosphate, and acetate and the like. More than one anion may be present. Inorganic and/or organic anions may be present. Suitable cerium salts may also contain additional non-cerium organic or inorganic cations, including other metal cations or other ammonium cations, including organic ammonium cations. When cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Cerium cations may be in any suitable oxidation state, including $Ce^{3+}$ and $Ce^{4+}$. Without wishing to be bound by theory, it is believed that at least a portion of the cerium cations persist in the polymer electrolyte because they are exchanged with $H^+$ ions from the anion groups of the polymer electrolyte and become associated with those anion groups. Furthermore, it is believed that polyvalent cerium cations may form crosslinks between anion groups of the polymer electrolyte, further adding to the stability of the polymer. However, in some embodiments cerium salts may be present in solid or precipitate form. In still other embodiments, cerium cations may be present in a combination of two or more forms including solvated cation, cation associated with bound anion groups of the PEM, and cation bound in a cerium salt precipitate. The amount of salt added is typically an amount which provides between 0.001 and 0.5 charge equivalents of cerium ion based on the molar amount of acid functional groups present in the polymer electrolyte, more typically between 0.005 and 0.2, more typically between 0.01 and 0.1, and more typically between 0.02 and 0.05.

Cerium oxide compounds may be crystalline or amorphous. The cerium oxide compound may contain cerium in the (IV) oxidation state, the (III) oxidation state, or both. In one embodiment, the cerium oxide compound is substantially free of metallic cerium. Alternately, the cerium oxide compound may contain both cerium oxide and metallic cerium. Alternately, the cerium oxide compound may be supported as a thin oxidation reaction product layer on a metallic cerium particle. In one embodiment, the cerium oxide compound may contain substantially no other metal elements. Alternately, the cerium oxide compound may contain other metal elements and thus may be considered a mixed metal oxide compound comprising cerium oxide. Examples of mixed metal oxide compounds comprising cerium oxide include solid solutions such as zirconia-ceria and multicomponent oxide compounds such as barium cerate. The amount of cerium oxide compound added is typically between 0.01 and 5 weight percent based on the total weight of the final polymer electrolyte or PEM, more typically between 0.1 and 2 wt %, and more typically between 0.2 and 0.3 wt %. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, typically between 1 and 5000 nm. In some embodiments, particle sizes of 200-5000 nm are preferred. In some embodiments, particle sizes of 500-1000 nm are preferred.

In some embodiments, the additive compounds include manganese. The manganese may be in any suitable oxidation state. In some embodiments, the additive solution/suspension includes ionic manganese in solution, i.e., a manganese salt. In some embodiments, the additive solution/suspension includes manganese oxides in suspension.

Manganese salts may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, but are most typically $Mn^{2+}$. Without wishing to be bound by theory, it is believed that the manganese cations persist in the polymer electrolyte because they are exchanged with $H^+$ ions from the anion groups of the polymer electrolyte and become associated with those anion groups. Furthermore, it is believed that polyvalent manganese cations may form crosslinks between anion groups of the polymer electrolyte, further adding to the stability of the polymer. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

Manganese oxides may include $MnO_2$ and $Mn_2O_3$. The amount of oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

A PEM according to the present invention may additionally comprise a porous support, such as a layer of expanded PTFE or the like, where the pores of the porous support contain the polymer electrolyte. A PEM according to the present invention may comprise no porous support. A PEM according to the present invention may comprise a crosslinked polymer.

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of making a durable fuel cell polymer electrolyte membrane comprising the steps of:

a) providing a polymer electrolyte membrane;

b) annealing the polymer electrolyte membrane to provide an annealed polymer electrolyte membrane;

c) providing a solution consisting of solvent selected from the group consisting of water, alcohols, ethers, ketones and combinations thereof, and an additive selected from the group consisting of manganese salts and cerium salts;

d) using metered application of the solution to one side of the annealed polymer electrolyte membrane by a method selected from the group consisting of spraying and using a slot die;

and wherein the solution is applied to only one side of the polymer electrolyte membrane.

2. The method according to claim 1 wherein the salt is a manganese salt.

3. The method according to claim 1 wherein the salt is a cerium salt.

4. The method according to claim 1 wherein said metered application of the solution to the annealed polymer electrolyte membrane is conducted by spraying.

5. The method according to claim 1 wherein said metered application of the solution to the annealed polymer electrolyte membrane is conducted by using a slot die.

* * * * *

UNITED STATES PATENT AND TRADEMARK OFFICE

CERTIFICATE OF CORRECTION

PATENT NO. : 8,110,320 B2
APPLICATION NO. : 11/962971
DATED : February 7, 2012
INVENTOR(S) : Steven J Hamrock It is certified that error appears in the above-identified patent and that said Letters Patent is hereby corrected as shown below:

IN THE CLAIMS:

Column 6,
Line 40, in Claim 1, after "salts;" insert -- and --.

Signed and Sealed this
First Day of May, 2012

David J. Kappos
*Director of the United States Patent and Trademark Office*